US010552966B2

(12) United States Patent
Eldar et al.

(10) Patent No.: US 10,552,966 B2
(45) Date of Patent: Feb. 4, 2020

(54) QUANTIFICATION OF PARALLAX MOTION

(71) Applicant: INTEL CORPORATION, Santa Clara, CA (US)

(72) Inventors: Avigdor Eldar, Jerusalem (IL); Dror Cohen, Jerusalem (IL); Sagi Levi, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 451 days.

(21) Appl. No.: 15/062,351

(22) Filed: Mar. 7, 2016

(65) Prior Publication Data

US 2017/0256060 A1    Sep. 7, 2017

(51) Int. Cl.
*G06K 9/00* (2006.01)
*G06T 7/269* (2017.01)

(52) U.S. Cl.
CPC .................................. *G06T 7/269* (2017.01)

(58) Field of Classification Search
CPC ......... G06T 7/85; G06T 7/60; H04N 13/0011; H04N 13/0022; H04N 13/0246; G06K 9/6215
See application file for complete search history.

(56) References Cited

U.S. PATENT DOCUMENTS

| 6,552,742 | B1 | 4/2003 | Seta | |
|---|---|---|---|---|
| 7,486,805 | B2 * | 2/2009 | Krattiger | A61B 1/042 356/603 |
| 8,718,325 | B2 * | 5/2014 | Osako | G06T 7/20 345/158 |
| 2013/0034296 | A1 * | 2/2013 | Hattori | G06K 9/00805 382/154 |
| 2013/0250065 | A1 | 9/2013 | Aoki et al. | |
| 2013/0250068 | A1 * | 9/2013 | Aoki | G06T 7/85 348/47 |
| 2013/0257870 | A1 * | 10/2013 | Kokojima | G06T 15/50 345/426 |
| 2014/0037138 | A1 * | 2/2014 | Sato | G08G 1/166 382/103 |
| 2014/0085182 | A1 | 3/2014 | Lin et al. | |
| 2014/0098196 | A1 | 4/2014 | Guan | |
| 2014/0133700 | A1 * | 5/2014 | Seki | G06K 9/00805 382/103 |

(Continued)

OTHER PUBLICATIONS

International Search Report for International PCT Application Serial No. PCT/US2017/014812 filed Jan. 25, 2017 dated May 4, 2017, 3 pages.

*Primary Examiner* — Bhavesh M Mehta
*Assistant Examiner* — Ian L Lemieux
(74) *Attorney, Agent, or Firm* — International IP Law Group, P.L.L.C.

(57) ABSTRACT

An electronic device for quantifying parallax motion is described. The electronic device includes a detecting unit to detect at least three fiducial markers in an image with parallax, wherein the at least three fiducial markers are part of a straight line in an input image; an estimating unit to estimate a best fit line to a curved line formed by the at least three fiducial markers, wherein the curved line is a result of parallax applied to the input image; a calculating unit to calculate an error between the best fit line and the curved line formed by the at least three fiducial markers; and a comparing unit to compare the error to a threshold limit.

21 Claims, 13 Drawing Sheets

(56) References Cited

U.S. PATENT DOCUMENTS

2014/0210956 A1\* 7/2014 Mori .................. G03B 17/20
 348/50
2014/0218357 A1 8/2014 Akao
2016/0100152 A1\* 4/2016 Park .................. G06T 19/00
 382/154

\* cited by examiner

200

QUANTIFICATION OF PARALLAX MOTION

BACKGROUND ART

Parallax may be a displacement or difference in the apparent position of an object viewed along two different lines of sight, and is measured by the angle or semi-angle of inclination between those two lines. The purpose of the parallax motion effect is to reconstruct an image as if the image were viewed from a different angle. The quality of an image with parallax can only be estimated using heuristic approaches. The quality of an image with parallax refers to the amount of distortion in the image introduced by the parallax motion effect. A good quality image with parallax preserves the straight lines in the input image.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The subject matter disclosed herein relates to techniques for quantifying parallax motion. The present disclosure describes techniques for quantifying parallax motion by calculating the error between a best fit line and a curved line formed by fiducial markers in an image with parallax. For example, an image may be input to a system and a straight line may be identified in the image. A drawn line may be inserted to correspond to the straight line. Fiducial markers may be added along the drawn line in the image. Parallax may be applied to the image containing the fiducial markers. The fiducial markers may be detected in the image with parallax. The fiducial markers may form a curved line as a result of the parallax applied to the image. The line that best fits the curved line may be estimated. The error between the best fit line and the curved line may be calculated. The error may be compared to a threshold limit. If the error is less than the threshold limit, the image with parallax may be retained. If the error is greater than the threshold limit, the parallax may be removed from the image. Various examples of the present techniques are described further below with reference to the figures.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Figure 1A:
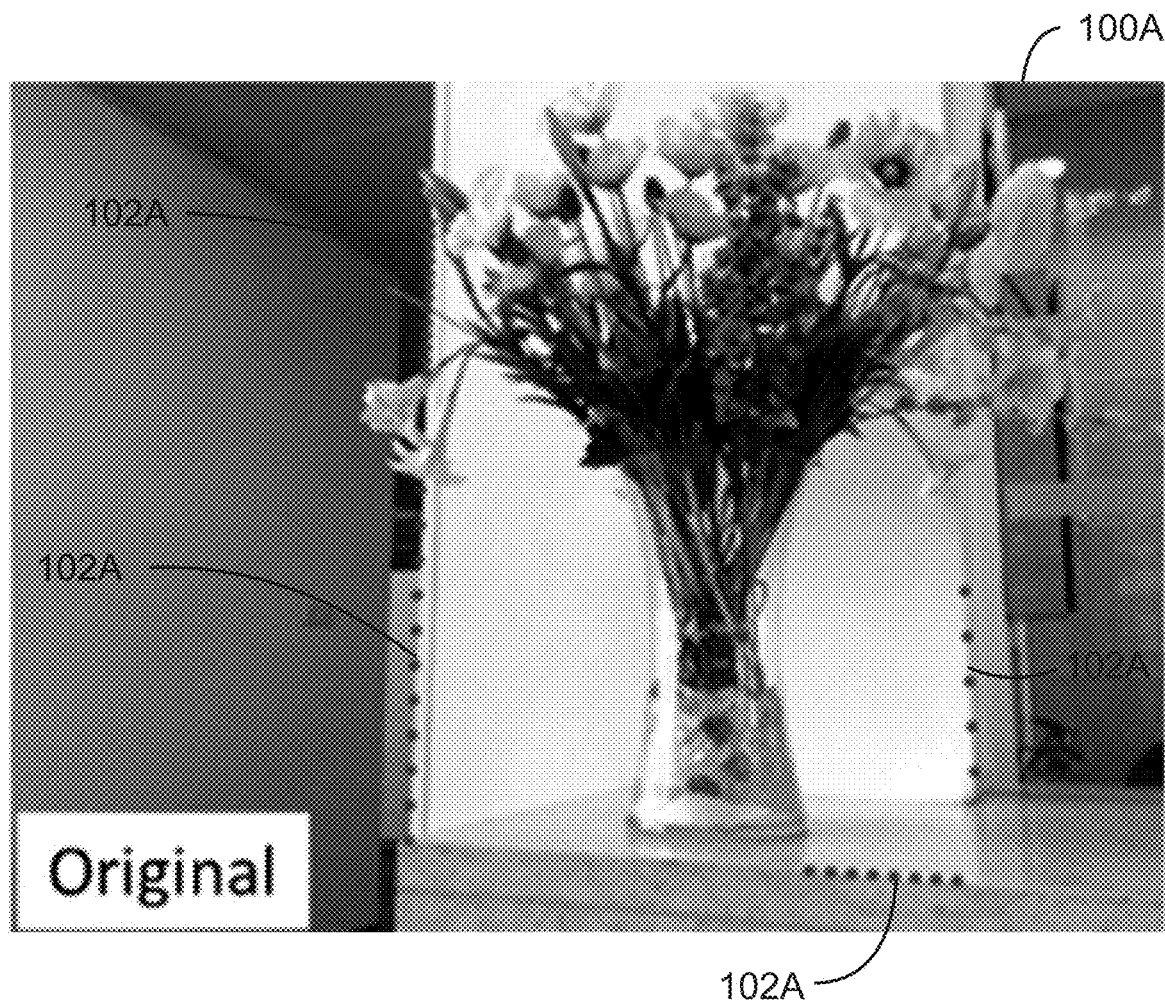
FIG. 1A is an image with fiducial markers.
Figure 1B:
FIG. 1B is the image of FIG. 1A after the application of a small movement to the left using the parallax motion effect.
Figure 1C:
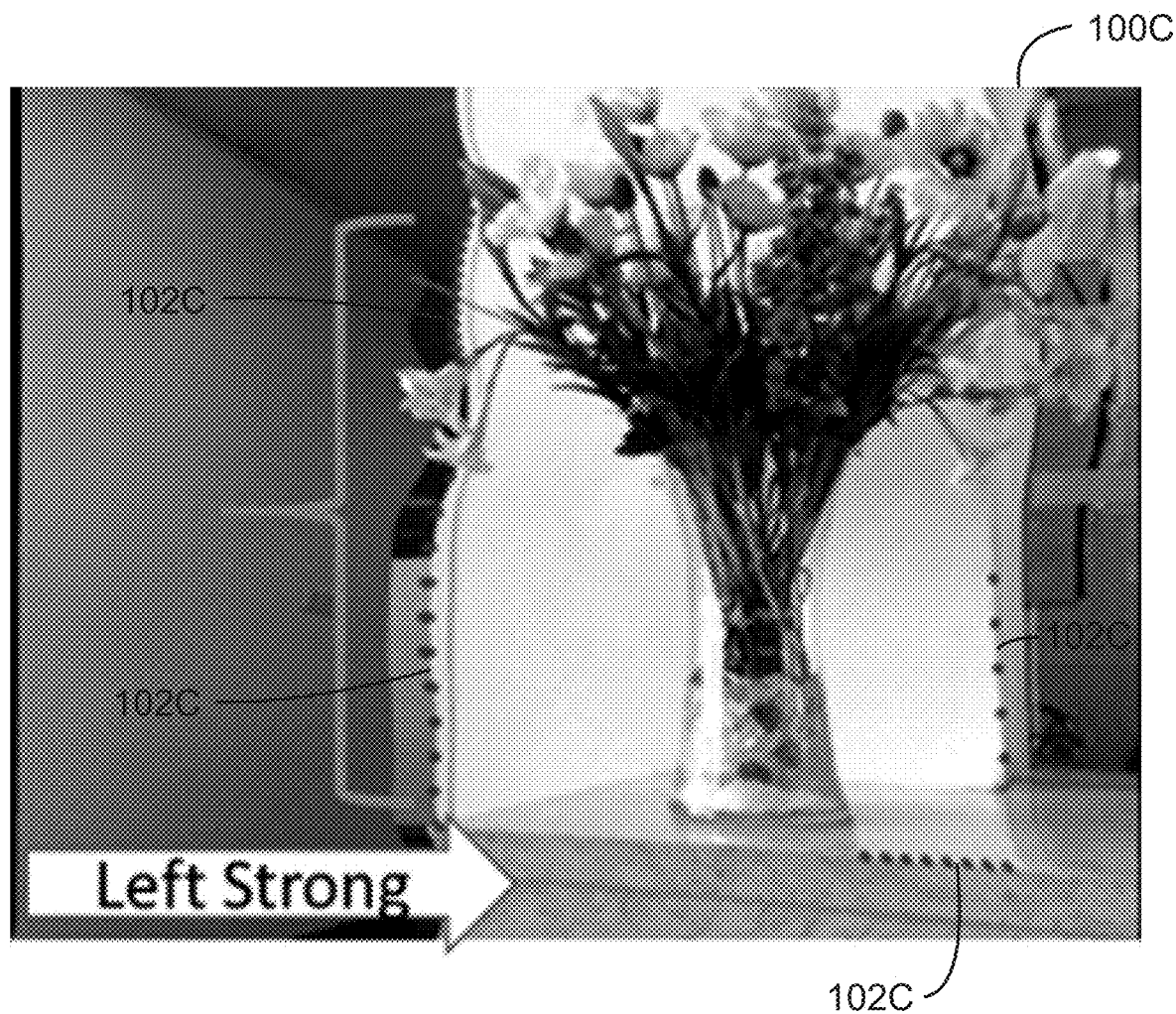
FIG. 1C is the image of FIG. 1A after the application of a large movement to the left using the parallax motion effect.

FIG. 1A is an image 100A with fiducial markers 102A. Fiducial markers are objects placed in the field of view of an image and are used as reference points. In FIG. 1A, the fiducial markers 102A form straight lines. For example, of the set of points constituting a straight line, every tenth point becomes a fiducial marker. In embodiments, the fiducial markers are small dots. Each small dot in FIG. 1A is a fiducial marker. Parallax has not been applied to FIG. 1A. The application of parallax simulates movement of a user's point of view. The techniques disclosed herein are predicated on the fact that the application of parallax should preserve straight lines in an image to maintain image quality. FIG. 1B is the image 100A of FIG. 1A after the application of a small movement to the left. The fiducial markers 102B still form straight lines and the quality of the image is preserved. FIG. 1C is the image 100A of FIG. 1A after the application of a large movement to the left. The fiducial markers 102C are no longer in straight lines and the image is distorted. As FIGS. 1B and 1C indicate, as more and more parallax is applied to an image, the more the lines delineated by the fiducial markers diverge from a straight line and become curved and the more the quality of the image degrades. The techniques described herein quantify the effect of parallax by calculating the extent to which the lines delineated by the fiducial markers deviate from a straight line.

Figure 2:
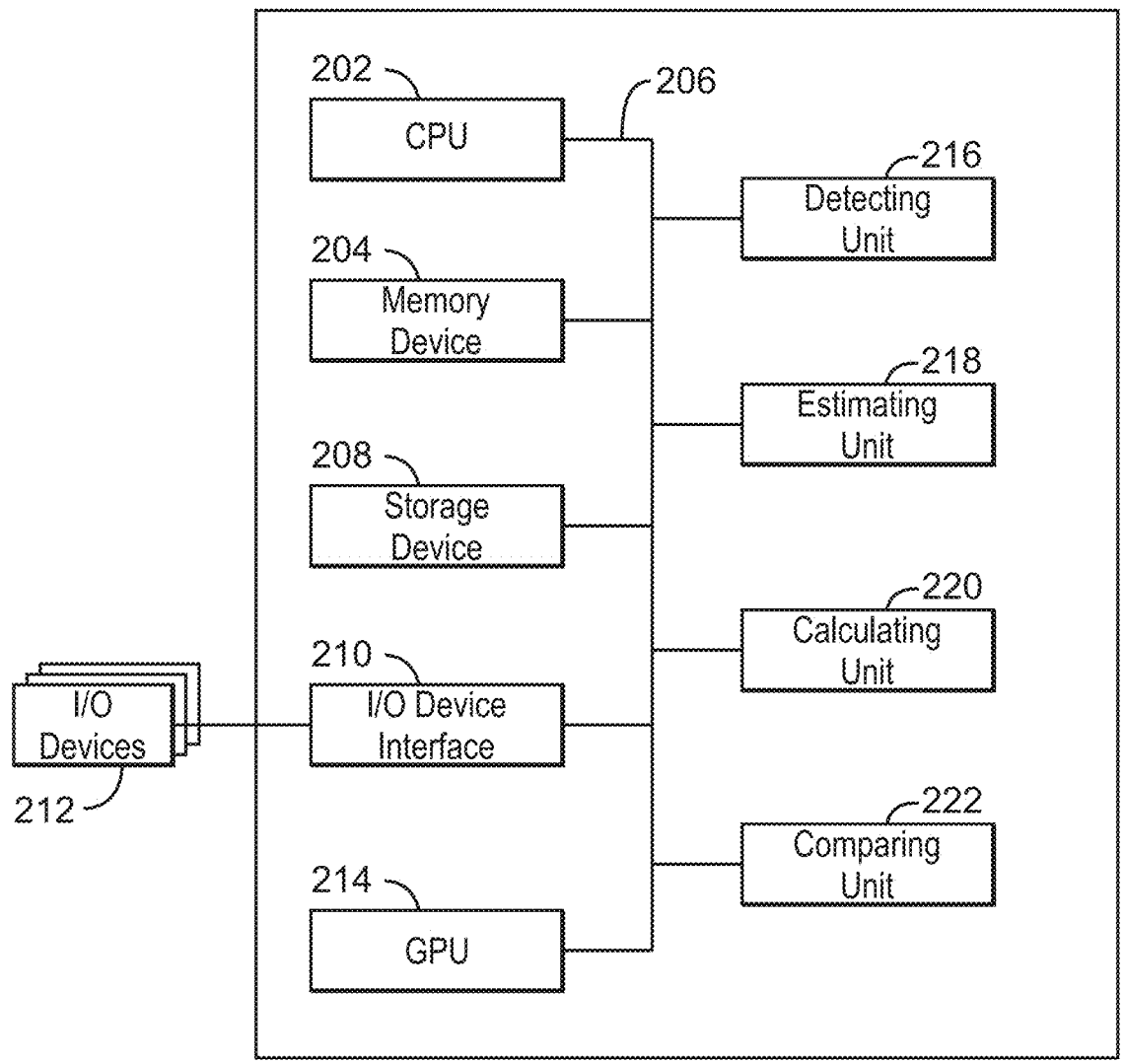
FIG. 2 is a block diagram of an electronic device for quantifying parallax motion.

FIG. 2 is a block diagram of an electronic device 200 for quantifying parallax motion. For example, the electronic device 200 may be a desktop computer, laptop computer, tablet computer, mobile phone, smart phone, or any other suitable electronic device. The electronic device 200 may include a central processing unit (CPU) 202 that is configured to execute stored instructions. The electronic device 200 may include a memory device 204 that is configured to store instructions that are executable by the CPU 202. The CPU 202 may be coupled to the memory device 204 by a bus 206. The CPU 202 may be a single core processor, a multi-core processor, a computing cluster, or any number of other configurations. The CPU 202 may be implemented as a Complex Instruction Set Computer (CISC) processor, a Reduced Instruction Set Computer (RISC) processor, x86 instruction set compatible processor, or any other microprocessor or central processing unit. In some embodiments, the CPU 202 includes dual-core processor(s), dual-core mobile processor(s), or the like.

The memory device 204 may include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory system. The memory device 204 can be used to store data and computer-readable instructions that, when executed by the CPU 202, direct the CPU 202 to perform various operations in accordance with embodiments described herein.

The electronic device 200 may also include a storage device 208. The storage device 208 is a physical memory device such as a hard drive, an optical drive, a flash drive, an array of drives, or any combinations thereof. The storage device 208 may store data such as original images and images with parallax applied, among other types of data. The storage device 208 may also store programming code such as device drivers, software applications, operating systems, and the like. The programming code stored by the storage device 208 may be executed by the CPU 202 or any other processors that may be included in the electronic device 200.

The electronic device 200 may also include an input/output (I/O) device interface 210 configured to connect the electronic device 200 to one or more I/O devices 212. For example, the I/O devices 212 may include a printer, a scanner, a keyboard, and a pointing device such as a mouse, touchpad, or touchscreen, among others. The I/O devices 212 may be built-in components of the electronic device 200, or may be devices that are externally connected to the electronic device 200.

The electronic device 200 may also include a graphics processing unit (GPU) 214. As shown, the CPU 202 may be coupled to the GPU 214 via the bus 206. The GPU 214 may be configured to perform any number of graphics operations. For example, the GPU 214 may draw lines in an image and may place fiducial markers along those lines before parallax is applied.

The electronic device 200 may include an inputting unit (not shown) to input an image from a 3D depth sensing camera. The 3D depth sensing camera may be a standalone camera or may be integrated into the electronic device 200. Standalone 3D depth sensing cameras include the Intel® RealSense™ Camera F200. 3D depth sensing cameras that may be integrated into the electronic device 200 include the Intel® RealSense™ Camera R200.

If the electronic device 200 includes an integrated 3D depth sensing camera, the camera may be communicatively coupled to the CPU 202 and the memory device 204. Whether the camera is a standalone camera or a camera integrated into the electronic device 200, the functions performed by the electronic device 200 are the same and are as described herein.

The electronic device 200 may include an identifying unit (not shown) to identify a straight line in the image by extracting an edge map from intensity gradients in the image and applying a voting procedure to the edge extracted from the intensity gradients in the image. An edge is defined to be a pixel in which there is a significant change in grayscale value relative to the pixel's neighborhood. Edge detection refers to a set of mathematical methods that identify points in a digital image at which the image brightness changes sharply or, more precisely, has discontinuities. Edge detection methods include, but are not limited to, Canny, Deriche, Differential, Sobel, Prewitt, and Roberts cross methods.

Using the edge map as input, the identifying unit may detect straight lines in the image by using a voting procedure on the extracted edges. The voting procedure is based on two main principles. The first principle is that a line can be represented by the equation $r=x \cos \theta + y \sin \theta$, where r is the distance from the origin to the closest point on the straight line, and e is the angle between the x axis and that closest point. The second principle has to do with the pixels in an edge. Each edge pixel with coordinates $(x_0, y_0)$ can be included in a number of lines. These lines are found by trying all possible $(r, \theta)$ pairs and choosing those $(r, \theta)$ pairs for which the equation $r=x_0 \cos \theta + y_0 \sin \theta$ holds true. Each edge pixel contributes one vote to each line which passes through the pixel. The lines that are chosen have enough votes to be valid lines. The lines chosen cannot be too short. In embodiments, the minimum line length is defined to be 11 pixels long. For example, a line may be drawn along an edge in the image using Hough lines and other similar methods. In embodiments, Hough lines are obtained according to the Hough transform.

The Hough transform finds imperfect instances of objects within a certain class of shapes by a voting procedure such as that described above. In some cases, this voting procedure is carried out in a parameter space, from which object candidates are obtained as local maxima in a so-called accumulator space that is explicitly constructed by the algorithm for computing the Hough transform.

The electronic device 200 may include an inserting unit (not shown) to insert a drawn line corresponding to the straight line identified by the identifying unit.

The electronic device 200 may include an adding unit (not shown) to add at least three fiducial markers along the drawn line in the image. The drawn line is inserted in the image first and then fiducial markers are added to delineate the drawn line. Once parallax is applied to the image, the drawn line delineated by the fiducial markers becomes curved. The curve is imperceptible when a small amount of parallax is applied, but becomes more pronounced as more parallax is applied to the image. A minimum of three fiducial markers should be added to ensure definition of the curved line in the image once parallax is applied.

The electronic device 200 may include an applying unit (not shown) to apply parallax to the image containing the at least three fiducial markers. The application of parallax mimics viewing the image from a different angle. FIGS. 1B and 1C are examples of an image to which parallax has been applied.

The electronic device 200 may also include a detecting unit 216 to detect the at least three fiducial markers in the image once parallax has been applied. The detecting unit 216 may detect the fiducial markers by using an optical flow estimation method that solves optical flow equations for all pixels in a neighborhood using a least squares criterion. An optical flow method tracks the new location of the fiducial markers in the image with parallax. For example, the fiducial markers may be detected using the Lucas-Kanade method and other similar optical flow estimation methods. Alternatively, the detecting unit 216 may detect the fiducial markers using a feature detection and correspondence method. Methods of this type encompass detecting feature points in the image with parallax and building a feature vector for each feature point. Given the representation by feature vectors, it is possible to match feature points detected in two sequential images. A feature detection and correspondence method tracks the location of corresponding fiducial markers in the input image and the image with parallax. For the techniques described herein, the input image and the image with parallax are two sequential images and the detecting unit 216 may find corresponding pairs of fiducial markers in the images by using feature vectors. For example, feature detection and correspondence methods include Scale-Invariant Feature Transform (SIFT), Speeded Up Robust Features (SURF), Binary Robust Invariant Scalable Keypoints (BRISK), and other similar methods. SIFT, SURF, and BRISK accomplish the same thing, the detection of feature points and the construction of feature vectors, but do so in different ways. Those skilled in the art will understand the differences between the workings of SIFT, SURF, and BRISK.

The electronic device 200 may also include an estimating unit 218 to estimate the line that best fits the curved line formed by the at least three fiducial markers once parallax has been applied to the input image. For example, a method for estimating the best fit line is perpendicular regression.

To fit a line using perpendicular regression, sufficient information is needed to scale the data points so the distributions of errors in the x and y directions have equal variances. One way of approaching perpendicular regression is to find the "principle directions" of the (x, y) data points. First, the centroid of the suitably scaled coordinates is calculated. The centroid is then subtracted from each of the set of (x, y) data points to yield a new set of $(x_1, y_1)$ data points. The equation $\tan(q)^2 + A \tan(q) - 1 = 0$, where $A = \Sigma(x_1^2 - y_1^2)/\Sigma x_1 y_1$, is used to find the principle directions.

Solving the above equation for tan(q) gives two solutions, which correspond to the principle directions, i.e., the directions in which the scatter of the data points is at a maximum and a minimum. The angle q is determined from the solution that yields the principle direction in which the scatter is at a minimum. The best fit line through the original set of (x, y) data points is a line at q degrees through the centroid. Other methods similar to perpendicular regression may be used.

The electronic device 200 may also include a calculating unit 220 for calculating the error between the best fit line and the curved line formed by the at least three fiducial markers. The error may be calculated as the mean Euclidean distance between the fiducial markers forming the curved line and the best fit line estimated by the estimating unit 218. A comparing unit 222 compares the error to a threshold limit. The threshold limit is determined statistically by examining "good" cases where the lines remain substantially straight after parallax is applied and "bad" cases where the lines do not remain substantially straight after parallax is applied. For each case, an error is calculated. The threshold limit is that error which is larger than the errors for all the good cases and smaller than the errors for all the bad cases.

A retaining unit (not shown) may retain the image with parallax if the error is less than the threshold limit. A removing unit (not shown) may remove the parallax if the error is greater than the threshold limit.

Communication between various components of the electronic device 200 may be accomplished via one or more busses 206. At least one of the busses 206 may be a D-PHY bus, a Mobile Industry Processor Interface (MIPI) D-PHY bus, or an M-PHY bus, or any other suitable bus.

The bus architecture shown in FIG. 2 is just one example of a bus architecture that may be used with the techniques disclosed herein. In some examples, the bus 206 may be a single bus that couples all of the components of the electronic device 200 according to a particular communication protocol. Furthermore, the electronic device 200 may also include any suitable number of busses 206 of varying types, which may use different communication protocols to couple specific components of the electronic device 200 according to the design considerations of a particular implementation.

The block diagram of FIG. 2 is not intended to indicate that the electronic device 200 is to include all of the components shown. Rather, the electronic device 200 can include fewer or additional components not shown in FIG. 2, depending on the details of the specific implementation. Furthermore, any of the functionalities of the CPU 202 may be partially, or entirely, implemented in hardware and/or by a processor. For example, the functionality may be implemented in any combination of Application Specific Integrated Circuits (ASICs), Field Programmable Gate Arrays (FPGAs), logic circuits, and the like. In addition, embodiments of the present techniques can be implemented in any suitable electronic device, including ultra-compact form factor devices, such as System-On-a-Chip (SOC), and multi-chip modules.

Figure 3:
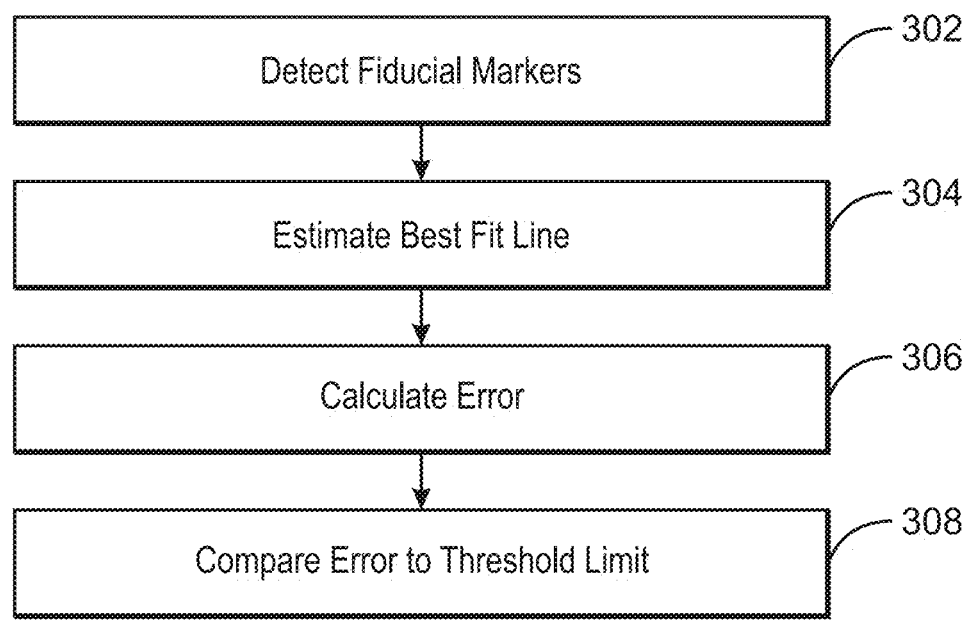
FIG. 3 is a process flow diagram of a method for quantifying parallax motion.

FIG. 3 is a process flow diagram of a method 300 for quantifying parallax motion. The method 300 may be performed by the electronic device 200 shown in FIG. 2. The method 300 may begin by inputting an image (not shown). A series of steps (not shown) may be required to prepare the input image for the application of parallax. A straight line may be identified in the input image. A drawn line may be inserted in the image to correspond to the straight line. At least three fiducial markers may be added along the drawn line. Parallax may be applied to the image containing the at least three fiducial markers (not shown). The application of parallax to the input image to obtain the image with parallax involves reconstructing the input image as if the input image were viewed from a different angle.

The method 300 may include blocks 302-308. At block 302, the at least three fiducial markers may be detected in the image with parallax. Because of the application of parallax, the line formed by the at least three fiducial markers may be a curved line. At block 304, a line that best fits the curved line may be estimated. This line may be referred to as a best fit line. At block 306, the error between the best fit line and the curved line may be calculated. At block 308, the error may be compared to a threshold limit. The image with parallax may be retained if the error is less than the threshold limit (not shown). The parallax may be removed if the error is greater than the threshold limit (not shown).

Figure 4:
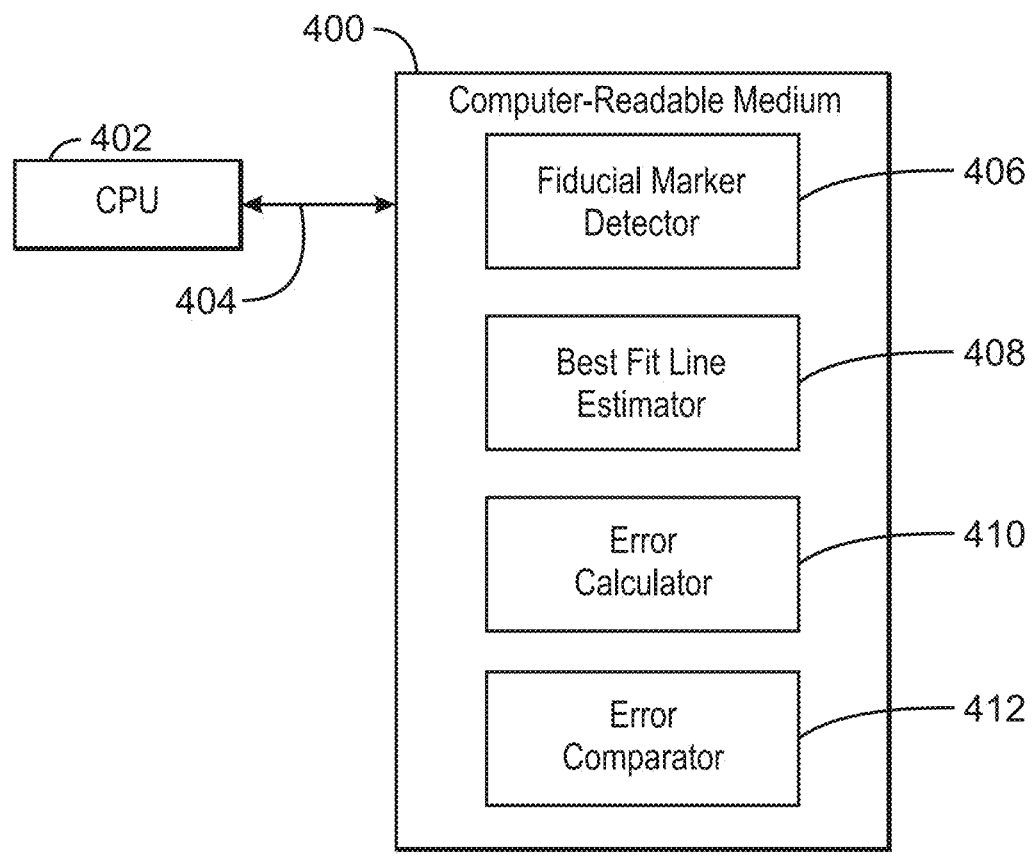
FIG. 4 is a block diagram showing a medium that contains logic for quantifying parallax motion.

FIG. 4 is a block diagram showing a medium 400 that contains logic for quantifying parallax motion. The medium 400 may be a non-transitory computer-readable medium that stores code that can be accessed by a computer processing unit (CPU) 402 via a bus 404. For example, the computer-readable medium 400 can be a volatile or non-volatile data storage device. The medium 400 can also be a logic unit, such as an Application Specific Integrated Circuit (ASIC), a Field Programmable Gate Array (FPGA), or an arrangement of logic gates implemented in one or more integrated circuits, for example.

The medium 400 may include modules 406-412 configured to perform the techniques described herein. For example, a fiducial marker detector 406 may be configured to detect the at least three fiducial markers in an image with parallax. A best fit line estimator 408 may be configured to estimate the line that best fits the curved line formed by the at least three fiducial markers. An error calculator may be configured to calculate the error between the best fit line and the curved line formed by the fiducial markers. An error comparator 412 may be configured to compare the error to a threshold limit. In some embodiments, the modules 406-412 may be modules of computer code configured to direct the operations of the processor 402.

The block diagram of FIG. 4 is not intended to indicate that the medium 400 is to include all of the components shown. Further, the medium 400 may include any number of additional components not shown in FIG. 4, depending on the details of the specific implementation.

Figure 5A:
FIG. 5A is an image to which parallax will be applied and quantified.
Figure 5B:
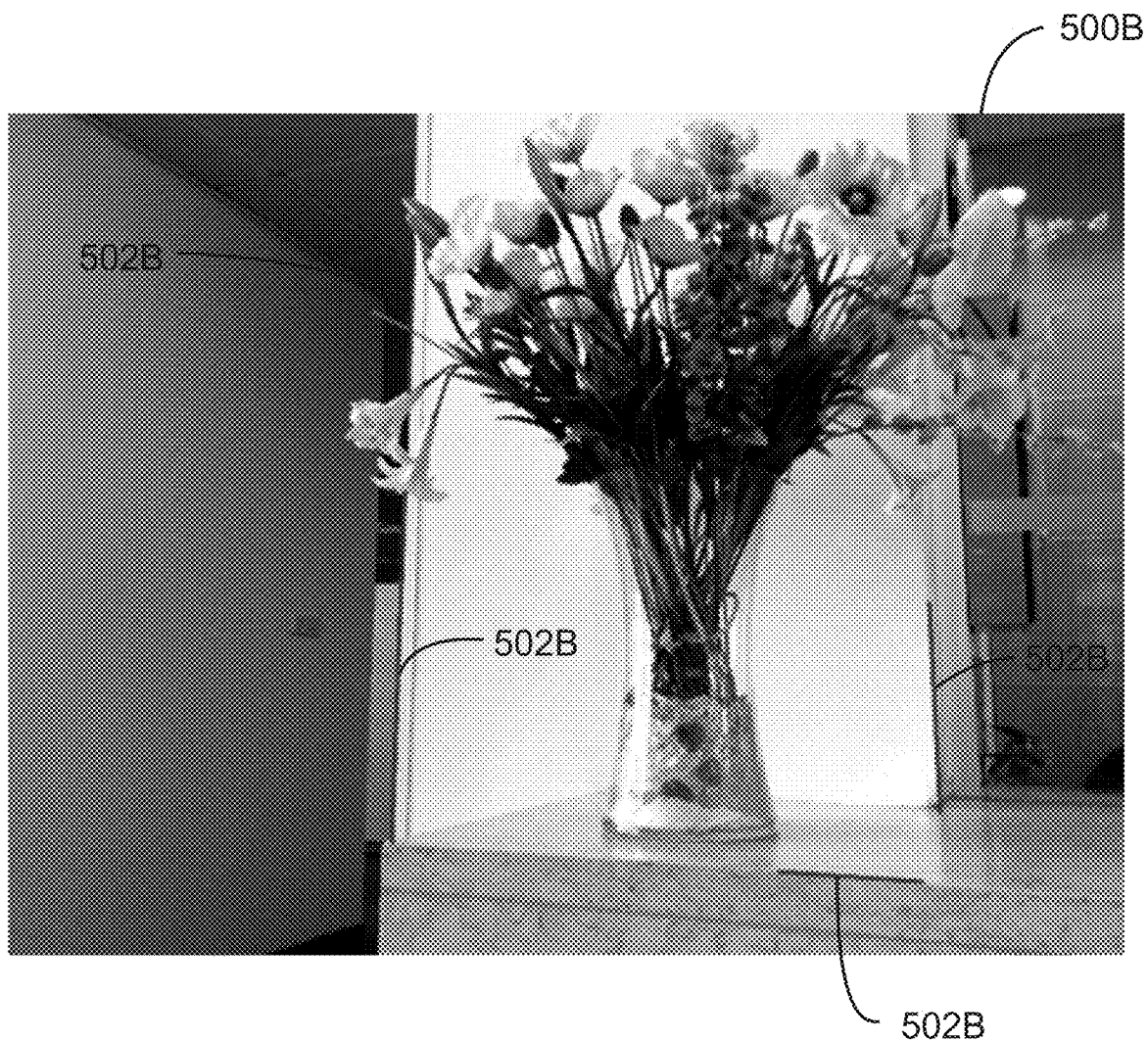
FIG. 5B is the image of FIG. 5A in which straight lines have been identified.
Figure 5C:
FIG. 5C is the image of FIG. 5B in which fiducial markers have been added along the straight lines.
Figure 5D:
FIG. 5D is the image of FIG. 5C in which a small movement has been simulated by parallax motion effect.
Figure 5E:
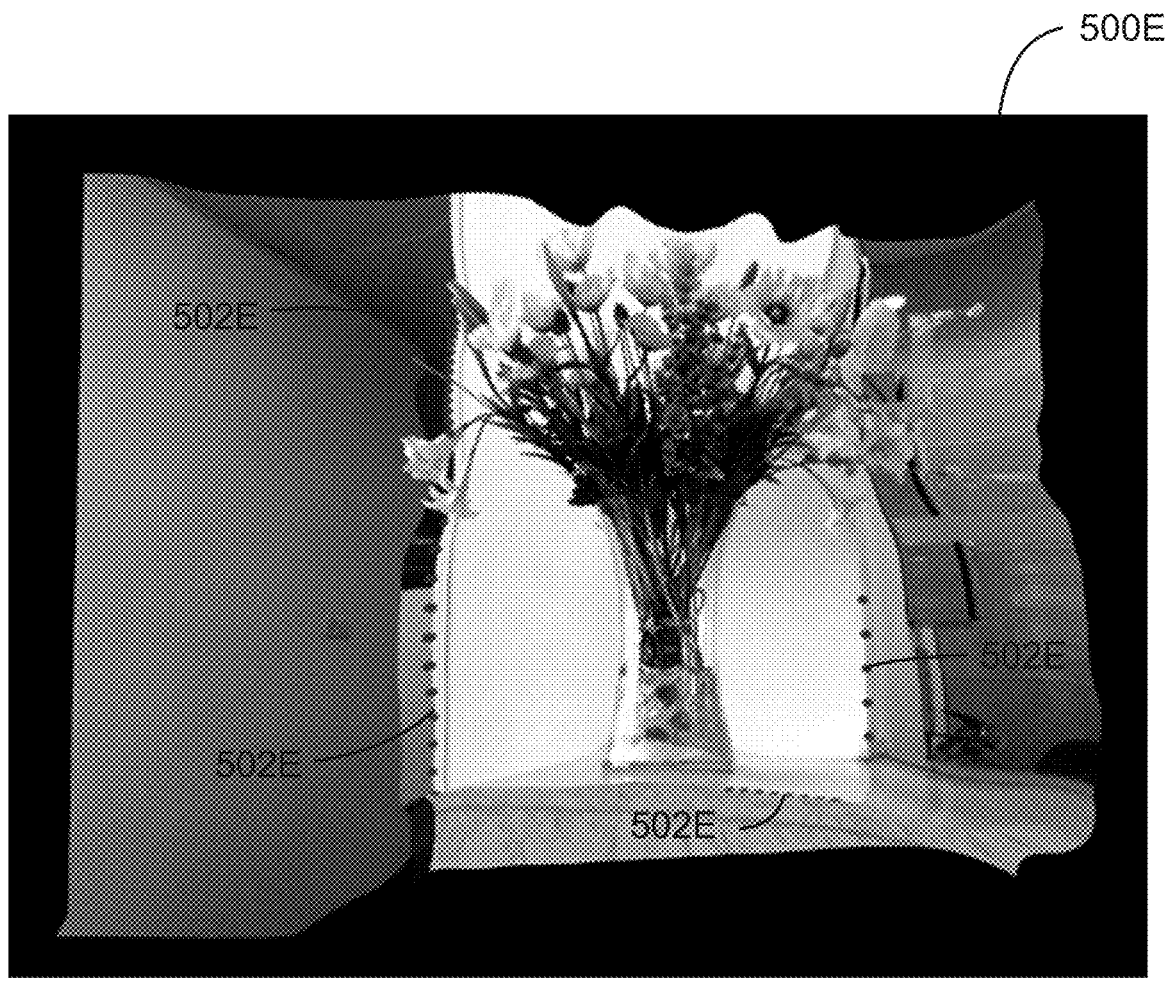
FIG. 5E is the image of FIG. 5C in which a large movement has been simulated by parallax motion effect.

FIGS. 5A-5E and FIGS. 6A and 6B are an example according to the present techniques. An image was obtained using an exemplary 3D depth sensing camera. This image 500A is shown in FIG. 5A. The Canny edge detection method was used to find edges in the image 500B. The Hough lines method was used to identify the straight lines. Drawn lines 502B corresponding to the straight lines were inserted into the image 500B. The drawn lines 502B are shown in FIG. 5B. Fiducial markers 502C were added to each line in the image 500C. The fiducial markers 502C are shown in FIG. 5C. Parallax was applied to image 500C using exemplary technology. The images with parallax 500D, 500E are shown in FIGS. 5D and 5E. Different movements are simulated in FIGS. 5D and 5E. A small movement is simulated in FIG. 5D and a larger movement is simulated in FIG. 5E. The fiducial markers 502D, 502E are still visible in the images with parallax 500D, 500E.

Figure 6A:
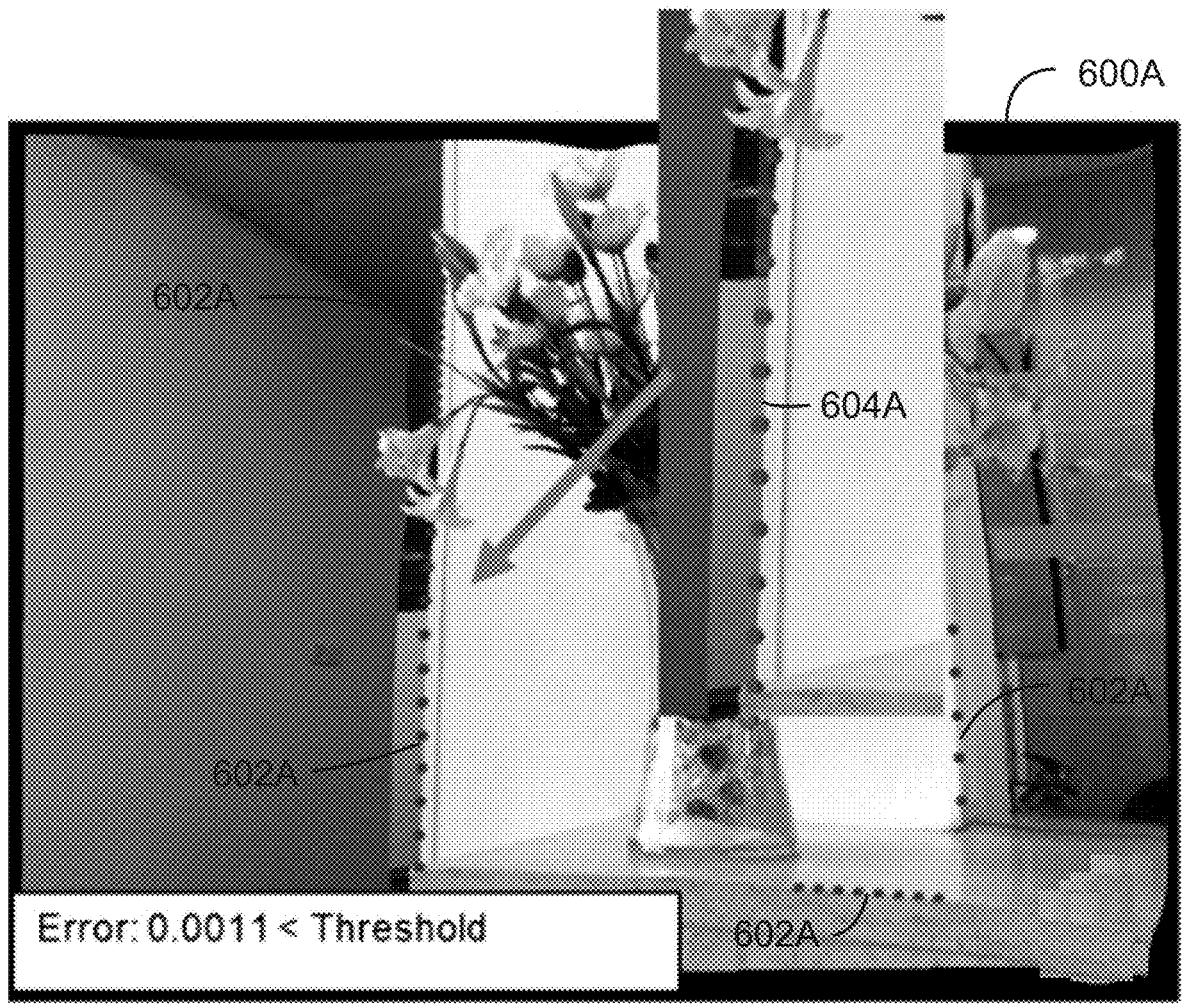
FIG. 6A is the image of FIG. 5D showing the line that best fits the curved line formed by the fiducial markers.
Figure 6B:
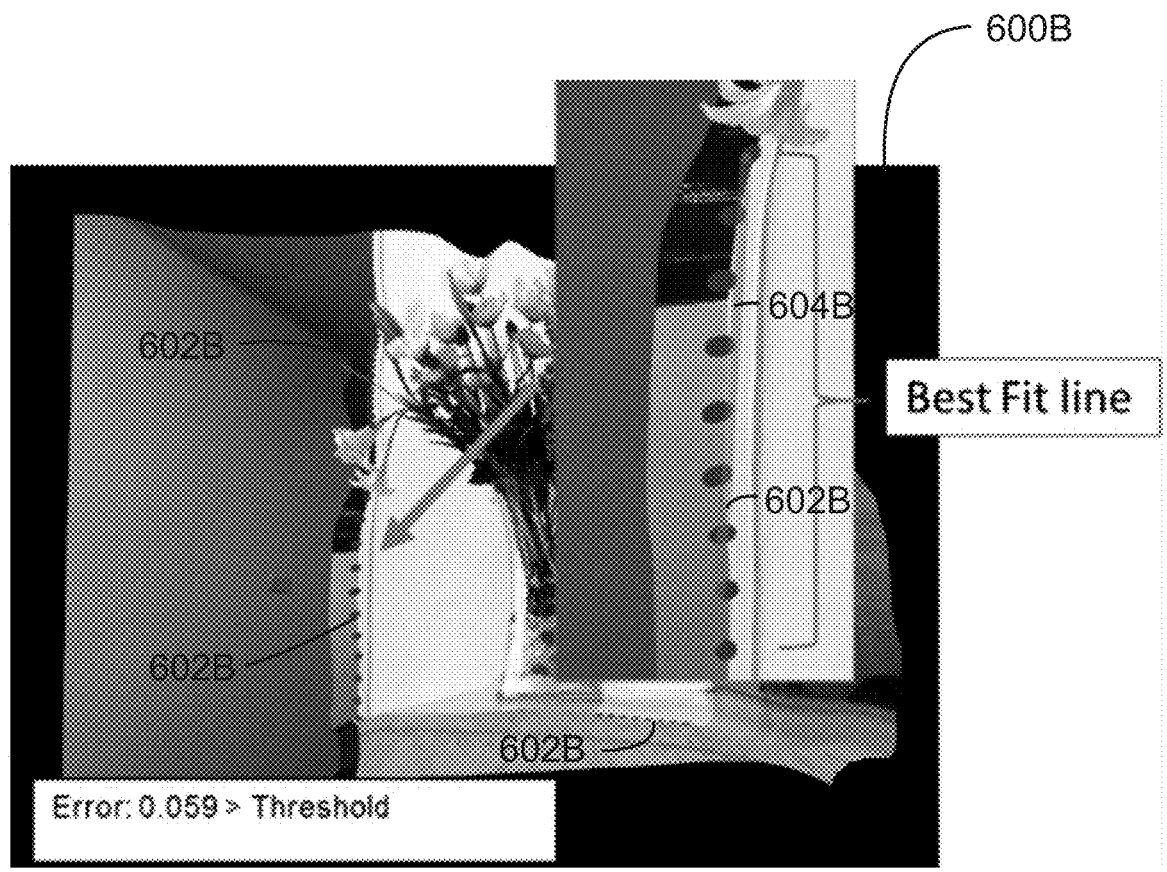
FIG. 6B is the image of FIG. 5E showing the line that best fits the curved line formed by the fiducial markers.

FIGS. 6A and 6B represent the evaluation of the quality of the images with parallax 500D, 500E. FIG. 6A corresponds to FIG. 5D and FIG. 6B corresponds to FIG. 5E. The straight lines, as indicated by the fiducial markers, become curved after the application of parallax. For each curved line in the images with parallax 600A, 600B, the fiducial markers 602A, 602B were detected using the Lucas-Kanade optical flow estimation method. For each curved line, a line that best fits the curved line was estimated using perpendicular regression. The error between the curved line and the best fit line was calculated for each curved line. The maximum error was determined for each curved line. In the insets to FIGS. 6A and 6B, the curved line, represented by the fiducial markers 602A, 602B, and the best fit line 604A, 604B are shown for the curved line that deviates the most from the best fit line. In other words, the best fit line 604A, 604B is shown for the curved line having the maximum error. The maximum error was compared to a threshold limit. As shown in FIG. 6A, the maximum error is less than the threshold limit indicating that the quality of the image 600A is good. Even though parallax was applied, the quality of the image 600A is good enough that the image 600A could be retained by a user. As shown in FIG. 6B, the maximum error is greater than the threshold limit indicating that the quality of the image 600B is poor. Given that the quality is poor, parallax will be removed from the image 600B.

The techniques described herein have other uses in addition to evaluating the quality of an image to which parallax has been applied. For example, the present techniques may be used to determine the extent to which parallax motion can be applied in a certain direction. A user would indicate a direction of movement and the present techniques would establish the bounds of the parallax that can be applied before image quality deteriorates to an unacceptable level. Furthermore, the present techniques may be used to validate parallax algorithms. A parallax algorithm reconstructs an image after parallax has been applied. The present techniques would evaluate how good the algorithm is at reconstructing the images. Moreover, the present techniques may be integrated into a gaming unit that uses video gesture control, a method for controlling onscreen interactions with simple body movements.

EXAMPLES

Example 1 is an electronic device for quantifying parallax motion. The electronic device includes a detecting unit to detect at least three fiducial markers in an image with parallax, wherein the at least three fiducial markers are part of a straight line in an input image; an estimating unit to estimate a best fit line to a curved line formed by the at least three fiducial markers, wherein the curved line is a result of parallax applied to the input image; a calculating unit to calculate an error between the best fit line and the curved line formed by the at least three fiducial markers; and a comparing unit to compare the error to a threshold limit.

Example 2 includes the electronic device of example 1, including or excluding optional features. In this example, the detecting unit detects the at least three fiducial markers by an optical flow estimation method that solves optical flow equations for all pixels in a neighborhood using a least squares criterion. Optionally, the optical flow estimation method comprises Lucas-Kanade method.

Example 3 includes the electronic device of any one of examples 1 to 2, including or excluding optional features. In this example, the detecting unit detects the at least three fiducial markers by a feature detection and correspondence method that detects feature points in the image with parallax and builds a feature vector for each feature point. Optionally, the feature detection and correspondence method comprises Scale-Invariant Feature Transform (SIFT), Speeded Up Robust Features (SURF), and Binary Robust Invariant Scalable Keypoints (BRISK) methods.

Example 4 includes the electronic device of any one of examples 1 to 3, including or excluding optional features. In this example, the electronic device includes a retaining unit to retain the image with parallax if the error is less than the threshold limit.

Example 5 includes the electronic device of any one of examples 1 to 4, including or excluding optional features. In this example, the electronic device includes a removing unit to remove the parallax if the error is greater than the threshold limit.

Example 6 includes the electronic device of any one of examples 1 to 5, including or excluding optional features. In this example, the electronic device includes an inputting unit to input an image; an identifying unit to identify a straight line in the image; an inserting unit to insert a drawn line corresponding to the straight line in the image; an adding unit to add the at least three fiducial markers along the drawn line in the image; and an applying unit to apply the parallax to the image containing the at least three fiducial markers to obtain the image with parallax. Optionally, the identifying unit identifies the straight line in the image by an edge detection and line identification method that extracts an edge map from intensity gradients in the image and applies a voting procedure to the edge extracted from the intensity gradients in the image. Optionally, the edge detection method comprises Canny edge detection. Optionally, the inserting unit inserts a drawn line onto the image by a line drawing method, and wherein the drawn line corresponds to the straight line identified by the identifying unit. Optionally, the line drawing method comprises Hough lines.

Example 7 is a method. The method includes detecting at least three fiducial markers in an image with parallax, wherein the at least three fiducial markers are part of a straight line in an input image; estimating a best fit line to a curved line formed by the at least three fiducial markers, wherein the curved line is a result of parallax applied to the input image; calculating an error between the best fit line and the curved line formed by the at least three fiducial markers; and comparing the error to a threshold limit.

Example 8 includes the method of example 7, including or excluding optional features. In this example, detecting at least three fiducial markers in an image with parallax comprises using an optical flow estimation method that solves optical flow equations for all pixels in a neighborhood using a least squares criterion. Optionally, the optical flow estimation method comprises Lucas-Kanade method.

Example 9 includes the method of any one of examples 7 to 8, including or excluding optional features. In this example, detecting at least three fiducial markers in an image with parallax comprises using a feature detection and correspondence method that detects feature points in the image with parallax and builds a feature vector for each feature point. Optionally, the feature detection and correspondence method comprises Scale-Invariant Feature Transform (SIFT), Speeded Up Robust Features (SURF), and Binary Robust Invariant Scalable Keypoints (BRISK) methods.

Example 10 includes the method of any one of examples 7 to 9, including or excluding optional features. In this example, the method includes retaining the image with parallax if the error is less than the threshold limit.

Example 11 includes the method of any one of examples 7 to 10, including or excluding optional features. In this example, the method includes removing the parallax if the error is greater than the threshold limit.

Example 12 includes the method of any one of examples 7 to 11, including or excluding optional features. In this example, the method includes inputting an image; identifying a straight line in the image; inserting a drawn line corresponding to the straight line in the image; adding the at least three fiducial markers along the drawn line in the image; and applying the parallax to the image containing the at least three fiducial markers to obtain the image with parallax. Optionally, identifying a straight line in the image comprises an edge detection and line identification method that extracts an edge map from intensity gradients in the image and applies a voting procedure to the edge extracted from the intensity gradients in the image. Optionally, the edge detection method comprises Canny edge detection. Optionally, inserting a drawn line comprises a line drawing method, wherein the drawn line corresponds to the straight line in the image. Optionally, the line drawing method comprises Hough lines. Optionally, applying parallax to the image containing the at least three fiducial markers to obtain the image with parallax comprises reconstructing the image containing the at least three fiducial markers as if the image containing the at least three fiducial markers were viewed from a different angle.

Example 13 is a system for quantifying parallax motion. The system includes a camera; a memory to store instructions that is communicatively coupled to the camera; and a processor communicatively coupled to the camera and the memory, wherein when the processor is to execute the instructions, the processor is to: detect at least three fiducial markers in an image with parallax, wherein the at least three fiducial markers are part of a straight line in an input image; estimate a best fit line to a curved line formed by the at least three fiducial markers, wherein the curved line is the result of parallax applied to the input image; calculate an error between the best fit line and the curved line formed by the at least three fiducial markers; and compare the error to a threshold limit.

Example 14 includes the system of example 13, including or excluding optional features. In this example, the processor is to detect the at least three fiducial markers by an optical flow estimation method that solves optical flow equations for all pixels in a neighborhood using a least squares criterion. Optionally, the optical flow estimation method comprises Lucas-Kanade method.

Example 15 includes the system of any one of examples 13 to 14, including or excluding optional features. In this example, the processor is to detect the at least three fiducial markers by a feature detection and correspondence method that detects feature points in the image with parallax and builds a feature vector for each feature point. Optionally, the feature detection and correspondence method comprises Scale-Invariant Feature Transform (SIFT), Speeded Up Robust Features (SURF), and Binary Robust Invariant Scalable Keypoints (BRISK) methods.

Example 16 includes the system of any one of examples 13 to 15, including or excluding optional features. In this example, the processor is to retain the image with parallax if the error is less than the threshold limit.

Example 17 includes the system of any one of examples 13 to 16, including or excluding optional features. In this example, the processor is to remove the parallax if the error is greater than the threshold limit.

Example 18 includes the system of any one of examples 13 to 17, including or excluding optional features. In this example, the processor is to: input an image; identify a straight line in the image; insert a drawn line corresponding to the straight line in the image; add the at least three fiducial markers along the drawn line in the image; and apply the parallax to the image containing the at least three fiducial markers to obtain the image with parallax. Optionally, the processor is to identify the straight line in the image by an edge detection and line identification method that extracts an edge map from intensity gradients in the image and applies a voting procedure to the edge extracted from the intensity gradients in the image. Optionally, the edge detection method comprises Canny edge detection. Optionally, the processor is to insert a drawn line by a line drawing method, and wherein the drawn line corresponds to the straight line identified in the image. Optionally, the line drawing method comprises Hough lines.

Example 19 is at least one computer-readable medium that directs the processor to quantify parallax motion. The computer-readable medium includes instructions that direct the processor to detect at least three fiducial markers in an image with parallax, wherein the at least three fiducial markers are part of a straight line in an input image; estimate a best fit line to a curved line formed by the at least three fiducial markers, wherein the curved line is the result of parallax applied to the input image; calculate an error between the best fit line and the curved line formed by the at least three fiducial markers; and compare the error to a threshold limit.

Example 20 includes the at least one computer-readable medium of example 19, including or excluding optional features. In this example, the at least one computer-readable medium includes instructions to direct the processor to detect the at least three fiducial markers by solving optical flow equations for all pixels in a neighborhood using a least squares criterion.

Example 21 includes the at least one computer-readable medium of any one of examples 19 to 20, including or excluding optional features. In this example, the at least one computer-readable medium includes instructions to direct the processor to retain the image with parallax if the error is less than the threshold limit.

Example 22 includes the at least one computer-readable medium of any one of examples 19 to 21, including or excluding optional features. In this example, the at least one computer-readable medium includes instructions to direct the processor to remove the parallax if the error is greater than the threshold limit.

Example 23 is at least one computer-readable medium of any one of examples 19 to 22, including or excluding optional features. The computer-readable medium includes instructions that direct the processor to input an image; identify a straight line in the image; insert a drawn line corresponding to the straight line in the image; add the at least three fiducial markers along the drawn line in the image; and apply the parallax to the image containing the at least three fiducial markers to obtain the image with parallax. Optionally, the at least one computer-readable medium includes instructions to direct the processor to identify the straight line in the image by extracting an edge map from intensity gradients in the image and applying a voting procedure to the edge extracted from the intensity gradients in the image.

Example 24 is an apparatus for quantifying parallax motion. The apparatus includes a means for detecting at least three fiducial markers in an image with parallax, wherein the at least three fiducial markers are part of a straight line in an input image; a means for estimating a best fit line to a curved line formed by the at least three fiducial markers, wherein the curved line is a result of parallax applied to the input image; a means for calculating an error between the best fit line and the curved line formed by the at least three fiducial markers; and a means for comparing the error to a threshold limit.

Example 25 includes the apparatus of example 24, including or excluding optional features. In this example, the means for detecting at least three fiducial markers in an image with parallax solves optical flow equations for all pixels in a neighborhood using a least squares criterion.

Example 26 includes the apparatus of any one of examples 24 to 25, including or excluding optional features. In this example, the means for detecting at least three fiducial markers in an image with parallax detects feature points in the image with parallax and builds a feature vector for each point.

Example 27 includes the apparatus of any one of examples 24 to 26, including or excluding optional features. In this example, the apparatus includes a means for retaining the image with parallax if the error is less than the threshold limit.

Example 28 includes the apparatus of any one of examples 24 to 27, including or excluding optional features. In this example, the apparatus includes a means for removing the parallax if the error is greater than the threshold limit.

Example 29 includes the apparatus of any one of examples 24 to 28, including or excluding optional features. In this example, the apparatus includes a means for inputting an image; a means for identifying a straight line in the image; a means for inserting a drawn line corresponding to the straight line in the image; a means for adding the at least three fiducial markers along the drawn line in the image; and a means for applying the parallax to the image containing the at least three fiducial markers to obtain the image with parallax. Optionally, the means for identifying a straight line in the image extracts an edge map from intensity gradients in the image and applies a voting procedure to the edge extracted from the intensity gradients in the image.

Some embodiments may be implemented in one or a combination of hardware, firmware, and software. Some embodiments may also be implemented as instructions stored on the tangible, non-transitory, machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the method or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An electronic device for quantifying parallax motion, comprising:
   a detecting unit to detect at least three fiducial markers in an image with parallax, wherein the at least three fiducial markers are part of a straight line in an input image;

an estimating unit to estimate a best fit line to a curved line formed by the at least three fiducial markers, wherein the curved line is a result of parallax applied to the input image;

a calculating unit to calculate an error between the best fit line and the curved line formed by the at least three fiducial markers;

a comparing unit to compare the error to a threshold limit;

an inputting unit to input an image;

an identifying unit to identify a straight line in the image;

an inserting unit to insert a drawn line corresponding to the straight line in the image;

an adding unit to add the at least three fiducial markers along the drawn line in the image; and an applying unit to apply the parallax to the image containing the at least three fiducial markers to obtain the image with parallax.

2. The electronic device of claim 1, wherein the detecting unit detects the at least three fiducial markers by an optical flow estimation method that solves optical flow equations for all pixels in a neighborhood using a least squares criterion.

3. The electronic device of claim 1, wherein the detecting unit detects the at least three fiducial markers by a feature detection and correspondence method that detects feature points in the image with parallax and builds a feature vector for each feature point.

4. The electronic device of claim 1, comprising a retaining unit to retain the image with parallax if the error is less than the threshold limit.

5. The electronic device of claim 1, comprising a removing unit to remove the parallax if the error is greater than the threshold limit.

6. The electronic device of claim 1, wherein the identifying unit identifies the straight line in the image by an edge detection and line identification method that extracts an edge map from intensity gradients in the image and applies a voting procedure to the edge extracted from the intensity gradients in the image.

7. The electronic device of claim 6, wherein the inserting unit inserts a drawn line onto the image by a line drawing method, and wherein the drawn line corresponds to the straight line identified by the identifying unit.

8. A method, comprising:
detecting at least three fiducial markers in an image with parallax, wherein the at least three fiducial markers are part of a straight line in an input image;

estimating a best fit line to a curved line formed by the at least three fiducial markers, wherein the curved line is a result of parallax applied to the input image;

calculating an error between the best fit line and the curved line formed by the at least three fiducial markers;

comparing the error to a threshold limit;

inputting an image;

identifying a straight line in the image;

inserting a drawn line corresponding to the straight line in the image;

adding the at least three fiducial markers along the drawn line in the image; and applying the parallax to the image containing the at least three fiducial markers to obtain the image with parallax.

9. The method of claim 8, wherein detecting at least three fiducial markers in an image with parallax comprises using an optical flow estimation method that solves optical flow equations for all pixels in a neighborhood using a least squares criterion.

10. The method of claim 8, wherein detecting at least three fiducial markers in an image with parallax comprises using a feature detection and correspondence method that detects feature points in the image with parallax and builds a feature vector for each feature point.

11. The method of claim 8, comprising retaining the image with parallax if the error is less than the threshold limit.

12. The method of claim 8, comprising removing the parallax if the error is greater than the threshold limit.

13. The method of claim 8, wherein identifying a straight line in the image comprises an edge detection and line identification method that extracts an edge map from intensity gradients in the image and applies a voting procedure to the edge extracted from the intensity gradients in the image.

14. The method of claim 8, wherein applying parallax to the image containing the at least three fiducial markers to obtain the image with parallax comprises reconstructing the image containing the at least three fiducial markers as if the image containing the at least three fiducial markers were viewed from a different angle.

15. A system for quantifying parallax motion, comprising:
a camera;
a memory to store instructions that is communicatively coupled to the camera; and
a processor communicatively coupled to the camera and the memory, wherein when the processor is to execute the instructions, the processor is to:
detect at least three fiducial markers in an image with parallax, wherein the at least three fiducial markers are part of a straight line in an input image;
estimate a best fit line to a curved line formed by the at least three fiducial markers, wherein the curved line is the result of parallax applied to the input image;
calculate an error between the best fit line and the curved line formed by the at least three fiducial markers;
compare the error to a threshold limit;
input an image;
identify a straight line in the image;
insert a drawn line corresponding to the straight line in the image;
add the at least three fiducial markers along the drawn line in the image; and
apply the parallax to the image containing the at least three fiducial markers to obtain the image with parallax.

16. The system of claim 15, wherein the processor is to retain the image with parallax if the error is less than the threshold limit.

17. The system of claim 15, wherein the processor is to remove the parallax if the error is greater than the threshold limit.

18. The system of claim 15, wherein the processor is to identify the straight line in the image by an edge detection and line identification method that extracts an edge map from intensity gradients in the image and applies a voting procedure to the edge extracted from the intensity gradients in the image.

19. At least one non-transitory computer-readable medium, comprising instructions to direct a processor to:
detect at least three fiducial markers in an image with parallax, wherein the at least three fiducial markers are part of a straight line in an input image;

estimate a best fit line to a curved line formed by the at least three fiducial markers, wherein the curved line is the result of parallax applied to the input image;

calculate an error between the best fit line and the curved line formed by the at least three fiducial markers;

compare the error to a threshold limit;

input an image;

identify a straight line in the image;

insert a drawn line corresponding to the straight line in the image;

add the at least three fiducial markers along the drawn line in the image; and apply the parallax to the image containing the at least three fiducial markers to obtain the image with parallax.

20. At least one non-transitory computer-readable medium of claim 19, comprising instructions to direct the processor to retain the image with parallax if the error is less than the threshold limit.

21. At least one non-transitory computer-readable medium of claim 19, comprising instructions to direct the processor to remove the parallax if the error is greater than the threshold limit.

\* \* \* \* \*